United States Patent
Yang

(10) Patent No.: US 11,704,281 B2
(45) Date of Patent: Jul. 18, 2023

(54) JOURNALING APPARATUS AND METHOD IN A NON-VOLATILE MEMORY SYSTEM

(71) Applicant: SK hynix Inc., Gyeonggi-do (KR)

(72) Inventor: Woo Young Yang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 220 days.

(21) Appl. No.: 17/340,535

(22) Filed: Jun. 7, 2021

(65) Prior Publication Data

US 2022/0197862 A1 Jun. 23, 2022

(30) Foreign Application Priority Data

Dec. 17, 2020 (KR) ........................ 10-2020-0177185

(51) Int. Cl.
*G06F 16/11* (2019.01)
*G06F 12/02* (2006.01)

(52) U.S. Cl.
CPC ........ *G06F 16/128* (2019.01); *G06F 12/0246* (2013.01); *G06F 12/0253* (2013.01); *G06F 2212/7205* (2013.01)

(58) Field of Classification Search
CPC .............. G06F 16/128; G06F 12/0253; G06F 2212/7205; G06F 12/0246
USPC ...................................................... 707/649
See application file for complete search history.

(56) References Cited

U.S. PATENT DOCUMENTS

| | | | |
|---|---|---|---|
| 9,959,046 B2 | 5/2018 | Huo et al. | |
| 10,013,346 B2 | 7/2018 | Dubeyko et al. | |
| 10,254,998 B2 * | 4/2019 | Sinha | G06F 3/0652 |
| 10,635,310 B2 * | 4/2020 | Kanno | G06F 3/0608 |
| 10,929,288 B1 * | 2/2021 | Moore | G06F 12/0246 |
| 2016/0062885 A1 * | 3/2016 | Ryu | G06F 12/0253 711/103 |
| 2016/0179386 A1 * | 6/2016 | Zhang | G06F 3/0679 711/103 |
| 2017/0123718 A1 * | 5/2017 | Sinha | G06F 3/0688 |
| 2017/0139825 A1 | 5/2017 | Dubeyko et al. | |
| 2017/0168951 A1 * | 6/2017 | Kanno | G06F 3/061 |
| 2017/0177252 A1 * | 6/2017 | Danilak | G06F 3/065 |
| 2018/0024919 A1 * | 1/2018 | Geml | G06F 3/061 711/103 |
| 2020/0019497 A1 * | 1/2020 | Na | G06F 3/0647 |

(Continued)

FOREIGN PATENT DOCUMENTS

| | | | | |
|---|---|---|---|---|
| AU | 2003286967 B2 * | 1/2009 | ......... | G06F 12/0253 |
| CN | 1732516 A * | 2/2006 | ......... | G06F 12/0253 |

(Continued)

OTHER PUBLICATIONS

Gwak et al., "Reducing Garbage Collection Overhead of Log-Structured File Systems with GC Journaling", 2015 IEEE International Symposium on Consumer Electronics (ISCE), Jun. 24-26, 2015, IEEE, 2 pages. (Year: 2015).*

*Primary Examiner* — Phuong Thao Cao

(74) *Attorney, Agent, or Firm* — IP & T Group LLP

(57) ABSTRACT

A memory system includes a memory device including memory blocks, and a controller configured to generate a result indicative of whether a number of free memory blocks satisfies a reference after beginning of garbage collection for the memory device, selectively perform a journaling operation for a request based on the result, and program data, collected by the garbage collection, in the memory device.

20 Claims, 7 Drawing Sheets

(56) References Cited

U.S. PATENT DOCUMENTS

2020/0348887 A1\* 11/2020 Kim .................... G06F 3/0619
2022/0035735 A1\* 2/2022 Bhardwaj ........... G06F 12/0253

FOREIGN PATENT DOCUMENTS

| CN | 106354660 | A | \* | 1/2017 | | |
| CN | 110688060 | A | \* | 1/2020 | ......... | G06F 12/0246 |
| CN | 111240586 | A | \* | 6/2020 | ......... | G06F 12/0253 |
| CN | 114647594 | A | \* | 6/2022 | ......... | G06F 12/0253 |
| JP | 2013200741 | A | \* | 10/2013 | ......... | G06F 12/0246 |
| KR | 20170002848 | A | \* | 1/2017 | ......... | G06F 12/0253 |
| WO | WO-2020124867 | A1 | \* | 6/2020 | ............. | G06F 12/08 |

\* cited by examiner

| PHY BLK # | P/E Cycles | VPC | IPC | Last Mod. Time | Data Type |
|---|---|---|---|---|---|
| 0 | 260 | 3 | aaa | x1/x2/x3 y1:y2:y3 | Metadata |
| 1 | 500 | bbb | 608 | x1/x5/x6 y4:y2:y5 | Userdata |
| ⋮ | | | | | |
| nnn-1 | 7 | ccc | ddd | x6/x7/x1 y6:y1:y4 | Userdata |
| nnn | 170 | 0 | 0 | n/a | n/a | ns (e.g., an interface unit, circuitry, etc.).

JOURNALING APPARATUS AND METHOD IN A NON-VOLATILE MEMORY SYSTEM

CROSS-REFERENCE TO RELATED APPLICATIONS

This patent application claims the benefit of Korean Patent Application No. 10-2020-0177185, filed on Dec. 17, 2020, the entire disclosure of which is incorporated herein by reference.

TECHNICAL FIELD

One or more embodiments described herein relate to a journaling apparatus and method in a memory system.

BACKGROUND

Portable electronic devices may be accessed virtually anytime and anywhere and include, for example, mobile phones, digital cameras, and notebook computers. Such devices may be equipped with one or more semiconductor memories that serve as main and/or auxiliary storage devices.

A semiconductor memory exhibits improved stability and durability, has no mechanical driving parts (e.g., a mechanical arm), and achieves high data access speeds and relatively low power consumption compared to hard disks. Examples of semiconductor memories include, but are not limited to, Universal Serial Bus (USB) memory devices, memory cards having various interfaces, and solid state drives (SSDs).

BRIEF DESCRIPTION OF THE DRAWINGS

The description herein makes reference to the accompanying drawings wherein like reference numerals refer to like parts throughout the figures.

DETAILED DESCRIPTION

Figure 1:
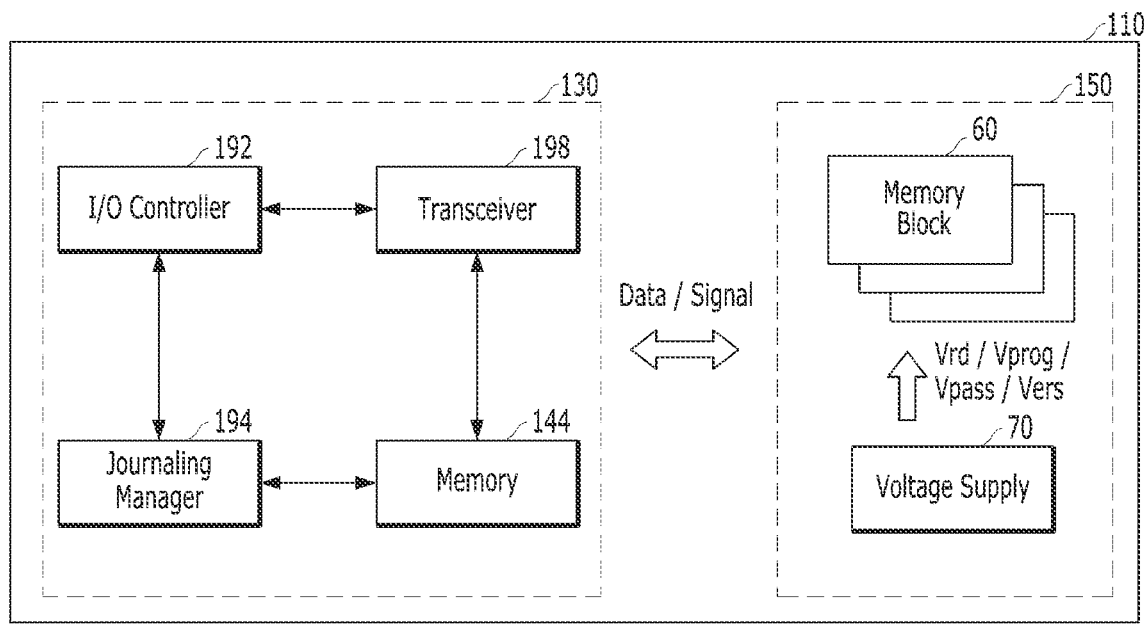
FIG. 1 illustrates an embodiment of a memory system.

Various embodiments of the disclosure are described below with reference to the accompanying drawings. Elements and features of the disclosure, however, may be configured or arranged differently to form other embodiments, which may be variations of any of the disclosed embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components (e.g., an interface unit, circuitry, etc.).

In this disclosure, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language include hardware for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

As used in the disclosure, the term 'circuitry' may refer to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" also covers an implementation of merely a processor (or multiple processors) or portion of a processor and its (or their) accompanying software and/or firmware. The term "circuitry" also covers, for example, and if applicable to a particular claim element, an integrated circuit for a storage device.

As used herein, the terms "first," "second," "third," and so on are used as labels for nouns that they precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Herein, an item of data or a data item may be a sequence of bits. For example, the data item may include the contents of a file, a portion of the file, a page in memory, an object in an object-oriented program, a digital message, a digital scanned image, a part of a video or audio signal, or any other entity which can be represented by a sequence of bits. According to an embodiment, the data item may include a discrete object. According to another embodiment, the data item may include a unit of information within a transmission packet between two different components.

In accordance with an embodiment, a data processing system and a method for operating the data processing system may include components and resources such as a memory system and a host, and is capable of dynamically allocating plural data paths used for data communication between the components based on usages of the components and the resources.

An embodiment of the disclosure can provide a method and an apparatus for improving operation safety by ceasing a journaling operation and performing a snapshot operation to easily secure a usable memory block through garbage collection in an operating environment in which it is difficult to allocate a memory block (e.g., a free memory block) usable for storing data in a memory device including a nonvolatile memory cell.

Further, in the memory system according to an embodiment of the disclosure, consumption of free blocks may continue when the journaling operation regarding data input/output is performed in a situation where power is unstable, and it is difficult to perform garbage collection so that securing a free memory block are delayed. Therefore, to secure the operation safety of the memory system, a method and an apparatus can be provided to reduce consumption of free memory block while ensuring atomicity for data input/output by performing the snapshot operation without the journaling operation.

In an embodiment of the present disclosure, a memory system can include a memory device including memory blocks; and a controller configured to generate a result indicative of whether a number of free memory blocks satisfies a reference after beginning of garbage collection for the memory device, selectively perform a journaling for a request based on the result, and program data, collected by the garbage collection, in the memory device.

The controller can be configured to cease the journaling operation when the number of free memory blocks is less than the reference, and program the data in the memory device with a snapshot operation.

The controller can be configured to, during the snapshot operation, store logical to virtual address mapping information, valid page information and invalid page information which are changed based on a program operation for the data according to the garbage collection.

The controller can be configured to perform a recovery operation using the logical to virtual address mapping information or track a location in which the data is stored based on the logical to virtual address mapping information. The location is changed by the garbage collection.

The controller can be configured to find out valid data in a target block subject to the garbage collection, when the logical to virtual address mapping information is incomplete because of a sudden power off (SPO).

The controller can be configured to mark a beginning and an end of a block allocation emergency mechanism in the memory device through the snapshot operation, based on the result.

The journaling operation can include at least one of: a first procedure for storing the data, collected by the garbage collection, in a log region of the memory device and performing a checkpoint operation when either a preset amount of time passes or the log region has no available space; or a second procedure for storing the data, collected by the garbage collection, in the log region and reflecting location change of the data in the file system region.

In another embodiment of the present disclosure, a method for operating a memory system can include triggering garbage collection; generating a result indicative of whether a number of free memory blocks in a memory device including a plurality of memory blocks satisfies a reference; selectively performing a journaling operation for a request based on the result; and programming data, collected by the garbage collection, in the memory device.

The method can further comprise ceasing the journaling operation, when the number of free memory blocks is less than the reference, and program the data in the memory device with a snapshot operation.

The snapshot operation can include an operation for storing logical to virtual address mapping information, valid page information and invalid page information which are changed based on a program operation for the data according to the garbage collection.

The method can further comprise performing a recovery operation using the logical to virtual address mapping information or track a location in which the data is stored based on the logical to virtual address mapping information, wherein the location is changed by the garbage collection.

The method can further comprise finding out valid data in a target block subject to the garbage collection, when the logical to virtual address mapping information is incomplete because of a sudden power off (SPO).

The snapshot operation can include an operation to mark a beginning and an end of block allocation emergency mechanism in the memory device through the snapshot operation, based on the result.

The journaling operation can include at least one of: a first procedure for storing the data, collected by the garbage collection in a log region of the memory device and performing a checkpoint operation when either a preset amount of time passes or the log region has no available space; or a second procedure for storing the data, collected by the garbage collection, in the log region and reflecting location change of the data in the file system region.

In another embodiment of the present disclosure, a controller can be coupled via at least one data path to a memory device including plural memory blocks, each memory block including a plurality of non-volatile memory cells. The controller can include at least one processor, at least one memory, and logic, at least a portion of the logic comprised in hardware, the logic to: trigger garbage collection; generate a result indicative of whether a number of free memory blocks in a memory device including a plurality of memory blocks satisfies a reference; selectively perform a journaling for a request based on the result; and program data, collected by the garbage collection, in the memory device.

The logic can be configured to cease the journaling operation when the number of free memory blocks is less than the reference, and program the data in the memory device with a snapshot operation.

The logic can be configured to, during the snapshot operation, store logical to virtual address mapping information, valid page information and invalid page information which are changed based on a program operation for the data according to the garbage collection.

The logic can be configured to perform a recovery operation using the logical to virtual address mapping information or track a location in which the data is stored based on the logical to virtual address mapping information.

The logic can be configured to find out valid data in a target block subject to the garbage collection, when the logical to virtual address mapping information is incomplete because of sudden power off (SPO).

The logic can be configured to mark a beginning and an end of a block allocation emergency mechanism in the memory device through the snapshot operation, based on the result.

Embodiments of the present disclosure will now be described with reference to the accompanying drawings, wherein like numbers reference like elements.

FIG. 1 illustrates an embodiment of a memory system 110, which may include a memory device 150 and a controller 130. The memory device 150 and the controller 130 may be considered components or elements which, for example, are physically separated from each other. The memory device 150 and the controller 130 may be connected via at least one data path, e.g., a channel and/or a way.

According to an embodiment, the memory device 150 and the controller 130 may be functionally divided. Further, according to an embodiment, the memory device 150 and the controller 130 may be implemented with a single chip or a plurality of chips. The controller 130 may perform data input/output operations in response to requests input from an external device. For example, when the controller 130 performs a read operation in response to a read request input from an external device, data stored in a plurality of non-volatile memory cells included in the memory device 150 is transferred to the controller 130.

The memory device 150 may include a plurality of memory blocks 60. The memory block 60 may include a group of non-volatile memory cells, in which data is removed together by a single erase operation. Each memory block 60 may include a page, which includes non-volatile memory cells that, for example, may store data together during a single program operation or may output data together during a single read operation. For example, one memory block may include a plurality of pages.

The memory device 150 may include a plurality of memory planes or a plurality of memory dies. According to an embodiment, a memory plane may be a logical or a physical partition including at least one memory block, a driving circuit that controls an array including a plurality of non-volatile memory cells, and a buffer that can temporarily store data input to, or output from, non-volatile memory cells.

According to an embodiment, a memory die may include at least one memory plane and, for example, may be understood as a set of components implemented on a physically distinguishable substrate. Each memory die may be connected to the controller 130 through a data path (e.g., a channel). Each memory die may include an interface to exchange a piece of data and a signal with the controller 130.

According to an embodiment, the memory device 150 may include at least one memory block 60, at least one memory plane, or at least one memory die. The internal configuration of the memory device 150 shown in FIG. 1 may be different according to performance of the memory system 110. An embodiment of the present disclosure is not limited to the internal configuration shown in FIG. 1.

Referring to FIG. 1, the memory device 150 may include a voltage supply 70 capable of supplying one or more voltages to the memory block. For example, the voltage supply 70 may supply a read voltage Vrd, a program voltage Vprog, a pass voltage Vpass, or an erase voltage Vers to a non-volatile memory cell in the memory block 60. For example, during a read operation for reading data stored in the non-volatile memory cell in the memory block 60, voltage supply 70 may supply the read voltage Vrd to a selected non-volatile memory cell.

During a program operation for storing data in the non-volatile memory cell in the memory block 60, the voltage supply 70 may supply the program voltage Vprog to a selected non-volatile memory cell. Also, during a read operation or a program operation performed on the selected nonvolatile memory cell, the voltage supply 70 may supply a pass voltage Vpass into a non-selected nonvolatile memory cell.

During an erasing operation for erasing data stored in the non-volatile memory cell in the memory block 60, the voltage supply 70 may supply the erase voltage Vers into the memory block 60.

The memory device 150 may store information regarding various voltages supplied to the memory block 60 based on which operation is performed. For example, when a non-volatile memory cell in the memory block 60 can store multi-bit data, plural levels of the read voltage Vrd may be used for recognizing or reading the multi-bit data. The memory device 150 may include a table including information corresponding to plural levels of the read voltage Vrd that correspond to the multi-bit data. For example, the table can include bias values stored in a register, each bias value corresponding to a specific level of the read voltage Vrd. The number of bias values for the read voltage Vrd used for a read operation may be limited to a preset range. Also, the bias values can be quantized.

In response to a request input from the external device, the controller 130 may perform a data input/output operation. For example, when the controller 130 performs a read operation corresponding to a read request input from the external device, data stored in a plurality of non-volatile memory cells in the memory device 150 may be transferred to the controller 130. For a read operation, input/output (I/O) controller 192 may transmit a read command to the memory device 150 through a transceiver 198. The transceiver 198 may transmit the read command to the memory device 150 and receive data output from the memory device 150. The transceiver 198 may store the data output from the memory device 150 in the memory 144. The input/output (I/O) controller 192 may output the data stored in the memory 144 to the external device in response to the read request.

In addition, input/output controller 192 may transmit data, input along with a write request from the external device, to the memory device 150 through the transceiver 198. After storing the data in the memory device 150, the input/output controller 192 may transmit to the external device a response of the write request indicating that the data is successfully programmed.

In some cases, it might be difficult to overwrite non-volatile memory cells in the memory device 150. This may cause a difference between an address used by an external device (e.g., a logical address) and an address used in the memory system 110 (e.g., a physical address). For example, it may be assumed that an external device had requested the memory system 110 to store a data item corresponding to a specific logical address and, after a lapse of time, requests the memory system 110 to store an updated data item corresponding to the same logical address.

After storing the data item in response to the previous request, the memory system 110 may not be able to store the updated data item at the same location where the data item is stored (the memory device 150 might not be overwritten). Accordingly, the memory system 110 can generate and control mapping information that connects an address used by an external device (e.g., a logical address) and an address used in the memory system 110 (e.g., a physical address). For example, a flash translation layer (FTL) 240 (e.g., see embodiments of FIGS. 2 and 3) may support that a data item can be stored in the memory device 150 regardless of the above-described characteristics of the memory system 110, and the stored data can be output to an external device.

A method for generating and controlling mapping information in the memory system 110 can be classified into three types: a page-level mapping method, a block-level mapping method and a hybrid mapping method. For example, the page-level mapping method can map two addresses (e.g., a logical address and a physical address) with each other on a per page basis. The block-level mapping method can map two addresses based on a block basis. The hybrid mapping method may be implemented as a combination of the page-level mapping method and the block-level mapping method.

In the page mapping method, the larger the storage space of the flash memory is, the larger the size of the map table becomes. This is because mapping is performed based on a page, which may be a smaller cell group of write or program operations than a memory block or a memory plane. Thus, the storage space of memory 144 allocated for the map table may also increase. For example, in the case of the memory system 110 having a 1 TB storage space for storing a data item of 4 bytes per 4 KB page, a 1 GB memory 144 may be used for loading and controlling all mapping information. In order to reduce the size of the map table, the block-level mapping method may use a map table created based on a memory block, which includes a plurality of pages. The block-level mapping method can reduce the size of the map table, but the storage space efficiency can be degraded, and many erase operations may occur.

As previously indicated, a hybrid mapping method may be implemented as a combination of the block-level mapping method and the page-level mapping method. A partial space in the memory device 150 may be used as a log buffer dedicated to updating data items. Therefore, when the hybrid mapping method is used, the memory device 150 can include two regions (e.g., a log region including at least one log memory block and a data region including at least one memory block) for storing data items. The at least one log memory block can be used for storing an updated data item which corresponds to a data item previously stored in the data region. The page-level mapping method can be used for the log region, while the block-level mapping method can be used for the data region. In the hybrid mapping method, the number of log memory blocks may vary depending on a size of page mapping information.

According to an embodiment, in the page-level mapping method, each logical page may be mapped to each physical page in the memory device 150. Thus, the page-level mapping method may be more flexible than the block mapping method for allocating, assigning, or mapping a physical address. In the page-level mapping method, the memory block 60 in the memory device 150 may form a log format which is similar to that used in a log structure file system. When a data item is written to the memory device 150, the data item and related information for the data item can be simply added to the end of the log format.

When a free space of the log format falls below a preset threshold, garbage collection may be triggered. After selecting a specific memory block, the controller 130 copies all valid pages of the corresponding memory block (that is, pages storing recent data items which have not been updated) at the end of the log format. The erase operation can be performed to the corresponding memory block, and the corresponding memory block can be added to a free block list.

For example, the memory system 110 may use a file system (e.g., Ext4 or XFS) that performs a logging or journaling operation when updating metadata. In one embodiment, the logging operation may be classified into redo and undo logging operations based at least on how the logging or journaling operation is to be performed. For example, a redo logging operation may store a new data item (e.g., a program data item) to the log region first and then may perform a checkpoint process, when a certain period of time elapses or the log region is insufficient. The checkpoint process may include, for example, copying or moving data items stored in the log region to the data region (e.g., a file system region).

An undo logging operation may correspond to a method for storing a new data item in the log region and reflecting the same data item in the data region (e.g., a file system region). Later, the undo logging operation may erase data items stored in the log region when, for example, the data items are no longer maintained in the log region.

In some cases, the undo logging operation may cause additional write operations to the log region, overhead could be increased (e.g., doubled) in the write operation. However, in a redo logging operation, the latest data item is stored in the log region, not the data region. Thus, overhead may occur in tracking the latest data when a read operation for the latest data item is performed. A journaling manager 194 (e.g., as illustrated in FIG. 1) may control the above-described logging or journaling operation performed in the memory system 110.

When the number of free blocks in the memory device 150 is sufficient (e.g., more than or equal to a predetermined number), there may be no difficulty in performing the above-described logging or journaling operation. However, when the number of free blocks in the memory device 150 is insufficient (e.g., below the predetermined number) or a preset condition is not satisfied, the memory system 110 may perform or trigger garbage collection.

As described above, when the logging or journaling operation is continuously performed even in a process of performing garbage collection, the time for securing a free block may be lengthened. When the number of free blocks in the memory device 150 does not satisfy a preset criterion, the memory system 110 can interrupt, cease, or stop the logging or journaling operation regarding copy or movement of data items according to the garbage collection. Also, in an embodiment, when the journaling operation is interrupted, ceased or stopped, the memory system 110 may perform a snapshot operation regarding some metadata, such as logical-to-virtual address mapping information L2V or the like.

Because the memory system 110 can guarantee atomicity through a journaling operation or a snapshot operation when power is applied again after power is turned off, data items stored together with the journaling operation or the snapshot operation can be restored or recovered.

Figure 2:
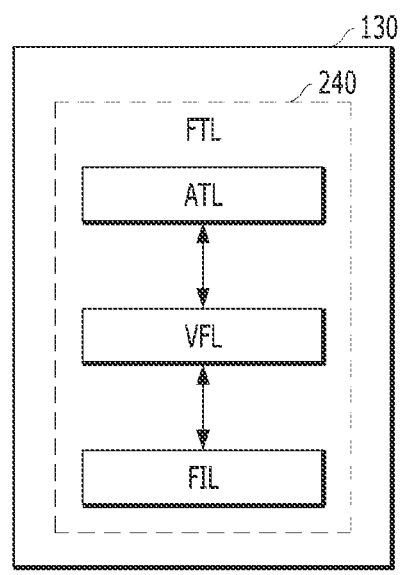
FIG. 2 illustrates an embodiment of a controller.

FIG. 2 illustrates an embodiment of an internal configuration of the controller 130 shown in FIG. 1.

Referring to FIG. 2, the controller 130 may include a flash translation layer (FTL) 240 which can be divided into three layers: an address translation layer ATL; a virtual flash layer VFL; and a flash Interface Layer FIL. For example, the address translation layer ATL may convert a logical address LA transmitted from a file system to a logical page address. The address translation layer ATL can perform an address translation process regarding a logical address space. That is, the address translation layer ATL can perform an address translation process based on mapping information to which the logical page address LPA of the flash memory 140 is mapped to the logical address LA transmitted from the host. Such logical-to-logical address mapping information (e.g., referred to as L2L mapping) may be stored in an area in which metadata is stored in the memory device 150.

The virtual flash layer VFL may convert the logical page address LPA, which is mapped by the address translation layer ATL, to a virtual page address VPA. A virtual page address VPA may correspond to a physical address of a virtual memory device, e.g., a virtual page address VPA may correspond to memory block 60 in the memory device 150. If there is a bad block among the memory blocks 60 in the memory device 150, the bad block may be excluded by the virtual flash layer VFL. In addition, the virtual flash layer VFL can include a recovery algorithm for scanning a scan area to restore the logical-to-virtual address mapping information (L2V mapping) stored in the memory device 150 and mapping information in the data region for storing user data. The recovery algorithm may recover the logical-to-virtual address mapping information (L2V mapping). The virtual flash layer VFL may perform an address conversion process regarding the virtual address space, based on the logical-to-virtual address mapping information (L2V mapping) restored through such a recovery algorithm.

The flash interface layer FIL can convert a virtual page address of the virtual flash layer VFL to a physical page address of the memory device 150. The flash interface layer FIL performs a low-level operation for interfacing with the memory device 150. For example, the flash interface layer FIL can include a low-level driver for controlling hardware of the memory device 150, an error correction code (ECC) for checking and correcting an error in data transmitted from the memory device 150, and a module for performing operations such as Bad Block Management (BBM).

Referring to FIGS. 1 to 2, when the number of free blocks in the memory device 150 does not satisfy a preset condition, the memory system 110 can interrupt, cease or stop a logging or journaling operation regarding data copy or movement for a data item subject to garbage collection. In the garbage collection, a valid data item stored in a target memory block (which would otherwise be erased) is first copied to another memory block. For example, even if the logging or journaling operation for copied or moved data items according to garbage collection is stopped, the logical-to-virtual address mapping information (L2V mapping) generated in the above-described virtual flash layer VFL is stored in the memory device 150. Therefore, even if the logging or journaling operation is not performed, the memory system 110 can track the location of copied or moved data according to the garbage collection, as well as read the copied or moved data in response to a request from an external device.

Further, when power is off without the logging or journaling operation regarding the copied data item in the garbage collection, the memory system can find out that data item at a previous location (e.g., in the target memory block). If a situation such as sudden power off (SPO) occurs and the logical-to-virtual address mapping information (L2V) generated in the virtual flash layer (VFL) could not be saved, the erase operation according to garbage collection might be not performed on the target memory block. Before this erase operation, the valid data item (latest data item) can be obtained from the previous location by accessing the target memory block.

While the journaling operation is stopped and data is stored in the memory device 150 along with the snapshot operation, the memory system 110 may increase the number of free blocks by performing garbage collection. When a new free memory block is secured through garbage collection and the number of free blocks satisfies the preset condition, the memory system 110 may perform the logging or journaling operation again.

As described above, the memory system 110 can determine whether to perform the logging or journaling operation in response to the number of free memory blocks in the memory device 150. Thus, it could be avoided that the memory system 110 becomes in a stuck state when the number of free memory blocks becomes insufficient. In addition, the memory system 110 can still guarantee atomicity of data which is read or programmed based on a request input from an external device, thereby improving safety and reliability of data input/output operation.

Figure 3:
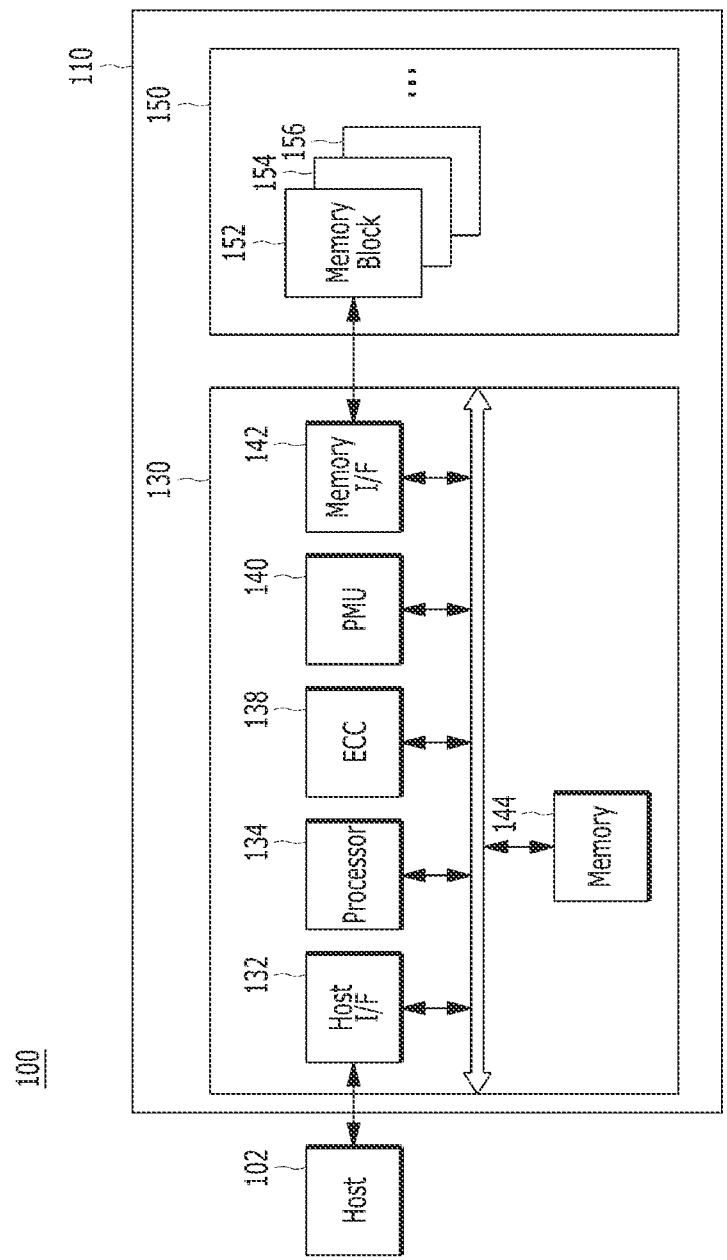
FIG. 3 illustrates an embodiment of a data processing system.
Figure 4:
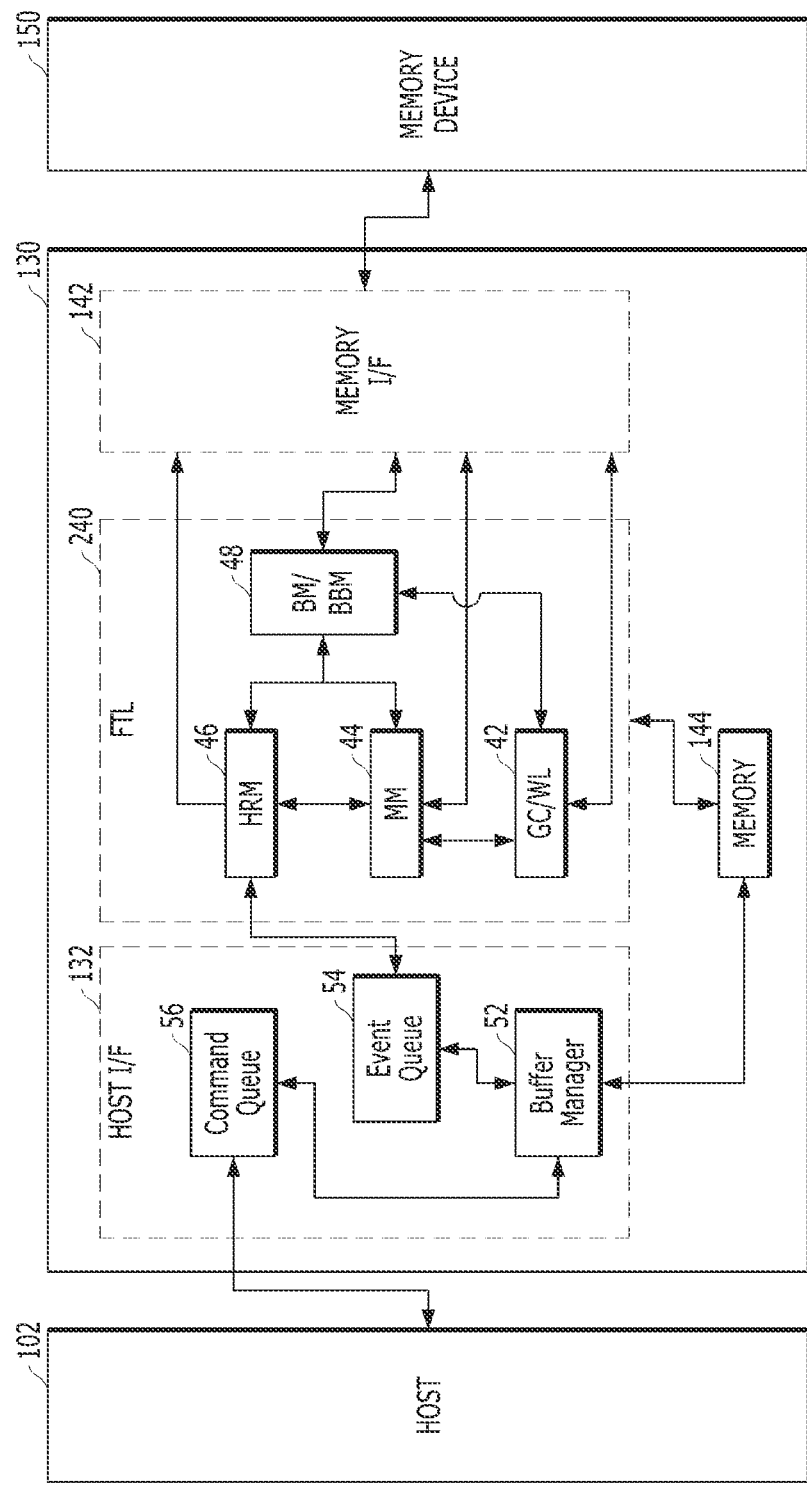
FIG. 4 illustrates an embodiment of a memory system.

FIGS. 3 and 4 illustrate embodiments of operations that may be performed by the memory system 110.

Referring to FIG. 3, a data processing system 100 may include a host 102 engaged or coupled with a memory system, such as memory system 110. The host 102 may include a portable electronic device (e.g., a mobile phone, an MP3 player, a laptop computer, etc.) or a non-portable electronic device (e.g., a desktop computer, a game player, a television, a projector, etc.).

The host 102 may also include at least one operating system (OS), which can control functions and operations performed in the host 102. The OS can provide interoperability between the host 102 engaged operatively with the memory system 110 and a user who intends to store data in the memory system 110. The OS may support functions and operations corresponding to user requests.

By way of example but not limitation, the OS can be classified as a general operating system or a mobile operating system according to mobility of the host 102. The general operating system may be split into a personal operating system and an enterprise operating system according to system requirements or a user environment. As compared with the personal operating system. The enterprise operating system can be specialized for securing and supporting high performance computing.

The mobile operating system may be subject to support services or functions for mobility (e.g., a power saving function). In one embodiment, the host 102 may include a plurality of operating systems. The host 102 may execute multiple operating systems interlocked with the memory system 110 based on a user request. The host 102 may transmit a plurality of commands corresponding to the user request to the memory system 110, thereby performing operations corresponding to commands within the memory system 110.

The controller 130 in the memory system 110 may control the memory device 150 in response to a request or a command input from the host 102. For example, the controller 130 may perform a read operation to provide an item of data read from the memory device 150 for the host 102 and may perform a write operation (or a program operation) to store an item piece of data input from the host 102 in the memory device 150. In order to perform data input/output (I/O) operations, the controller 130 may control and manage internal operations for data read, data program, data erase, or the like.

According to an embodiment, the controller 130 can include a host interface 132, a processor 134, error correction circuitry 138, a power management unit (PMU) 140, a memory interface 142, and a memory 144. Components in the controller 130 illustrated in FIG. 3 may vary according structure, function, operation performance, or the like, regarding the memory system 110 among embodiments.

For example, the memory system 110 may be implemented with any of various types of storage devices electrically coupled with the host 102 and according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like. Components in the controller 130 may be added or omitted based on implementation of the memory system 110.

The host 102 and the memory system 110 may include a controller or an interface for transmitting and receiving signals, an item of data, and the like, in accordance with one or more predetermined protocols. For example, the host interface 132 in the memory system 110 may include an apparatus capable of transmitting signals, an item of data, and the like, to the host 102 or receiving signals, an item of data, and the like, input from the host 102.

The host interface 132 in the controller 130 may receive signals, commands (or requests), and/or an item of data input from the host 102. For example, the host 102 and the memory system 110 may use a predetermined protocol to transmit and receive an item of data between each other. Examples of protocols or interfaces, supported by the host 102 and the memory system 110 for sending and receiving an item of data, include Universal Serial Bus (USB), Mufti-Media Card (MMC), Parallel Advanced Technology Attachment (DATA), Small Computer System Interface (SCSI), Enhanced Small Disk Interface (ESDI), Integrated Drive Electronics (IDE), Peripheral Component Interconnect Express (PCIS), Serial-attached SCSI (SAS), Serial Advanced Technology Attachment (SATA), Mobile Industry Processor Interface (MIPI), and the like. According to an embodiment, the host interface 132 may be a type of layer for exchanging an item of data with the host 102 and may be implemented with, or driven by, firmware called a host interface layer (HIL).

The Integrated Drive Electronics (IDE) or Advanced Technology Attachment (ATA) may be used as one of the interfaces for transmitting and receiving data and, for example, may use a cable including 40 wires connected in parallel to support data transmission and reception between the host 102 and the memory system 110. When a plurality of memory systems 110 are connected to a single host 102, the memory systems 110 may be divided into a master and a slave using a position or a dip switch to which the memory systems 110 are connected. The memory system 110 set as the master may be used as the main memory device. The IDE (ATA) may include, for example, Fast-ATA, ATAPI, and Enhanced IDE (EIDE).

Serial Advanced Technology Attachment (SATA) is a type of serial data communication interface compatible with various ATA standards of parallel data communication interfaces used by Integrated Drive Electronics (IDE) devices. The 40 wires in the IDE interface can be reduced to six wires in the SATA interface. For example, 40 parallel signals for the IDE can be converted to 6 serial signals for SATA to be transmitted between each other. The SATA has been widely used because of faster data transmission and reception rates and less resource consumption in the host 102 used for data transmission and reception. The SATA may support connection with up to 30 external devices to a single transceiver in the host 102. In addition, the SATA can support hot plugging that allows an external device to be attached or detached from the host 102, even while data communication between the host 102 and another device is being executed. Thus, memory system 110 can be connected or disconnected as an additional device, like a device supported by a Universal Serial Bus (USB) even when the host 102 is powered on. For example, in the host 102 having an eSATA port, the memory system 110 may be freely detached like an external hard disk.

Small Computer System Interface (SCSI) is a type of serial data communication interface used for connection between a computer, a server, and/or other peripheral devices. The SCSI can provide high transmission speed compared with other interfaces such as the IDE and the SATA. In the SCSI, the host 102 and at least one peripheral device (e.g., memory system 110) are connected in series, but data transmission and reception between the host 102 and each peripheral device may be performed through a parallel data communication. In the SCSI, it is easy to connect to, or disconnect from, the host 102 a device such as the memory system 110. The SCSI can support connections of 15 other devices to a single transceiver in host 102.

Serial Attached SCSI (SAS) can be understood as a serial data communication version of the SCSI. In the SAS, not only the host 102 and a plurality of peripheral devices are connected in series, but also data transmission and reception between the host 102 and each peripheral device may be performed in a serial data communication scheme. The SAS can support connection between the host 102 and the peripheral device through a serial cable instead of a parallel cable, to easily manage equipment using the SAS and enhance or improve operational reliability and communication performance. The SAS may support connections of eight external devices to a single transceiver included in the host 102.

The Non-volatile memory express (NVMe) is a type of interface based at least on a Peripheral Component Interconnect Express (PCIe) designed to increase performance and design flexibility of the host 102, servers, computing devices, and the like equipped with the non-volatile memory system 110. PCIe can use a slot or a specific cable for connecting the host 102 (e.g., a computing device) and the memory system 110 (e.g., a peripheral device). For example, PCIe can use a plurality of pins (for example, 18 pins, 32 pins, 49 pins, 82 pins, etc.) and at least one wire (e.g., ×1, ×4, ×8, ×16, etc.) to achieve high speed data communication over several hundred MB per second (e.g., 250 MB/s, 500 MB/s, 984.6250 MB/s, 1969 MB/s, and etc.). According to an embodiment, the PCIe scheme may achieve bandwidths of tens to hundreds of Giga bits per second. A system using the NVMe can efficiently use operation speed of the non-volatile memory system 110, such as an SSD, which operates at a higher speed than a hard disk.

According to an embodiment, the host 102 and memory system 110 may be connected through a universal serial bus (USB). The Universal Serial Bus (USB) is a type of scalable, hot-pluggable plug-and-play serial interface that can provide cost-effective standard connectivity between the host 102 and a peripheral device, such as a keyboard, a mouse, a joystick, a printer, a scanner, a storage device, a modem, a video camera, and the like. A plurality of peripheral devices such as the memory system 110 may be coupled to a single transceiver included in the host 102.

Referring to FIG. 3, the error correction circuitry 138 can correct error bits of the data to be processed in (e.g., output from) the memory device 150, which may include an error correction code (ECC) encoder and an ECC decoder. The ECC encoder can perform error correction encoding of data to be programmed in the memory device 150 to generate encoded data into which a parity bit is added and store the encoded data in memory device 150. The ECC decoder can detect and correct errors contained in data read from the memory device 150 when the controller 130 reads the data stored in the memory device 150.

For example, after performing error correction decoding on the data read from the memory device 150, the error correction circuitry 138 can determine whether the error correction decoding has succeeded and output an instruction signal (e.g., a correction success signal or a correction fail signal). The error correction circuitry 138 can use a parity bit generated during the ECC encoding process for correcting the error bit of the read data. When the number of the error bits is greater than or equal to a threshold number of correctable error bits, the error correction circuitry 138 might not correct error bits but instead may output an error correction fail signal indicating failure in correcting the error bits.

According to an embodiment, the error correction circuitry 138 may perform an error correction operation based on a coded modulation. Examples include coded modulations based on a low density parity check (LDPC) code, a Bose-Chaudhuri-Hocquenghem (BCH) code, a turbo code, a Reed-Solomon (RS) code, a convolutional code, a recursive systematic code (RSC), a trellis-coded modulation (TCM), and a Block coded modulation (BCM) as well as others. The error correction circuitry 138 may include circuits, modules, systems, and/or devices for performing the error correction operation based on at least one of the above described codes.

For example, the ECC decoder may perform hard decision decoding or soft decision decoding to data transmitted from the memory device 150. The hard decision decoding can be understood as one of two methods broadly classified for error correction. Hard decision decoding may include an operation of correcting an error by reading digital data of '0' or '1' from a non-volatile memory cell in the memory device 150. Because the hard decision decoding handles a binary logic signal, the circuit/algorithm design or configuration may be simpler and processing speed may be faster than soft decision decoding.

Soft decision decoding may quantize a threshold voltage of a non-volatile memory cell in the memory device 150 by two or more quantized values (e.g., multiple bit data, approximate values, an analog value, and the like) in order to correct an error based on the two or more quantized values. The controller 130 can receive two or more alphabets or quantized values from a plurality of non-volatile memory cells in the memory device 150, and then perform a decoding based on information generated by characterizing the quantized values as a combination of information such as conditional probability or likelihood.

According to an embodiment, the ECC decoder may use low-density parity-check and generator matrix (LDPC-GM) code among methods designed for the soft decision decoding. The low-density parity-check (LDPC) code uses an algorithm that can read values of data from the memory device 150 in several bits according to reliability, not simply data of 1 or 0 like hard decision decoding, and iteratively repeats it through a message exchange in order to improve reliability of the values. Then, the values are finally determined as data of 1 or 0. For example, a decoding algorithm using LDPC codes can be understood as probabilistic decoding.

Hard decision decoding in which the value output from a non-volatile memory cell is coded as 0 or 1. Compared to hard decision decoding, soft decision decoding can determine the value stored in the non-volatile memory cell based on the stochastic information. Regarding bit-flipping (which may be considered an error that can occur in the memory device 150), soft decision decoding may provide improved probability of correcting error and recovering data, as well as provide reliability and stability of corrected data. The LDPC-GM code may have a scheme in which internal LDGM codes can be concatenated in series with high-speed LDPC codes.

According to an embodiment, the ECC decoder may use, for example, low-density parity-check convolutional codes (LDPC-CCs) code for soft decision decoding. The LDPC-CCs code may have a scheme using a linear time encoding and a pipeline decoding based on a variable block length and a shift register.

According to an embodiment, the ECC decoder may use, for example, a Log Likelihood Ratio Turbo Code (LLR-TC) for soft decision decoding. The Log Likelihood Ratio (LLR) may be calculated as a non-linear function for a distance between a sampled value and an ideal value. In addition, Turbo Code (TC) may include a simple code (for example, a Hamming code) in two or three dimensions and repeat decoding in a row direction and a column direction to improve reliability of values.

The power management unit (PMU) 140 may control electrical power in the controller 130. The PMU 140 may monitor the electrical power supplied to the memory system 110 (e.g., a voltage supplied to the controller 130) and provide the electrical power to components in the controller 130. The PMU 140 can not only detect power-on or power-off, but also can generate a trigger signal to enable the memory system 110 to back up a current state urgently when the electrical power supplied to the memory system 110 is unstable. According to an embodiment, the PMU 140 may include a device or a component capable of accumulating electrical power that may be used in an emergency.

The memory interface 142 may serve as an interface for handling commands and data transferred between the controller 130 and the memory device 150, in order to allow the controller 130 to control the memory device 150 in response to a command or a request input from the host 102. The memory interface 142 may generate a control signal for the memory device 150 and may process data input to, or output from, the memory device 150 under the control of the processor 134 in a case when the memory device 150 is a flash memory. For example, when the memory device 150 includes a NAND flash memory, the memory interface 142 includes a NAND flash controller (NFC). The memory interface 142 can provide an interface for handing commands and data between the controller 130 and the memory device 150. In accordance with an embodiment, the memory interface 142 can be implemented through, or driven by, firmware called a Flash Interface Layer (FIL) for exchanging data with the memory device 150.

According to an embodiment, the memory interface 142 may support an open NAND flash interface (ONFi), a toggle mode, or the like, for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), and a toggle double data rate (DDR). For example, an operation for programming a data item along with the journaling operation or the snapshot operation, described in FIG. 1, can be performed by a device or a module for interfacing data communication between the controller 130 and the memory device 150.

The memory 144 may be a type of working memory in the memory system 110 or the controller 130, while storing temporary or transactional data occurred or delivered for operations in the memory system 110 and the controller 130. For example, the memory 144 may temporarily store read data output from the memory device 150 in response to a request from the host 102, before the read data is output to the host 102. In addition, the controller 130 may temporarily store write data input from the host 102 in the memory 144, before programming the write data in the memory device 150. When the controller 130 controls operations such as data read, data write, data program, data erase, etc., of the memory device 150, an item of data transmitted or generated between the controller 130 and the memory device 150 of the memory system 110 may be stored in the memory 144.

In addition to the read data or write data, the memory 144 may store information (e.g., map data, read requests, program requests, etc.) used for inputting or outputting data between the host 102 and the memory device 150. According to an embodiment, the memory 144 may include a plurality of areas allocated for a command queue, a program memory, a data memory, a write buffer/cache shown in FIG. 1, a read buffer/cache shown in FIG. 2, a data buffer/cache, a map buffer/cache, and/or the like. The controller 130 may allocate some storage space in the memory 144 for a component which is established to carry out a data input/output operation. For example, the write buffer established in the memory 144 may be used to temporarily store target data subject to a program operation.

In an embodiment, the memory 144 may be implemented with a volatile memory. For example, the memory 144 may be implemented with a static random access memory (SRAM), a dynamic random access memory (DRAM), or both. Although FIG. 2 illustrates that memory 144 is disposed within the controller 130, the embodiments are not limited thereto. The memory 144 may be external and coupled to the controller 130. For instance, the memory 144 may be embodied by an external volatile memory having a memory interface for transferring data and/or signals between the memory 144 and the controller 130.

The processor 134 may control overall operation of the memory system 110. For example, the processor 134 can control a program operation or a read operation of the memory device 150 in response to a write request or a read request from the host 102. According to an embodiment, the processor 134 may execute firmware to control the program operation or the read operation in the memory system 110. Herein, the firmware may be referred to as a flash translation layer (FTL). An example of the FTL is described with reference to FIG. 4. According to an embodiment, the processor 134 may be implemented with a microprocessor or a central processing unit (CPU).

According to an embodiment, the memory system 110 may be implemented with at least one multi-core processor. The multi-core processor may be a type of circuit or chip in which two or more cores, considered to be distinct processing regions, are integrated. For example, when a plurality of cores in the multi-core processor drive or execute a plurality of flash translation layers (FTLs) independently, data input/output speed (or performance) of the memory system 110 may be improved. According to an embodiment, the data input/output (I/O) operations in the memory system 110 may be independently performed through different cores in the multi-core processor.

The processor 134 in the controller 130 may perform an operation corresponding to a request or a command input from the host 102. Further, the memory system 110 may be independent of a command or a request input from an external device such as host 102. In one case, an operation performed by the controller 130 in response to the request or the command input from host 102 may be considered a foreground operation, while an operation performed by the controller 130 independently (e.g., regardless the request or the command input from the host 102) may be considered a background operation.

The controller 130 can perform foreground or background operations for read, write or program, erase and the like, regarding a piece of data in the memory device 150. In addition, a parameter set operation corresponding to a set parameter command or a set feature command as a set command transmitted from the host 102 may be considered a foreground operation. Examples of background operations that can be performed by controller 130 without a command from the host 102 include garbage collection (GC), wear leveling (WL), bad block management for identifying and processing bad blocks, or the like. The background operations may be performed, for example, in relation to a plurality of memory blocks 152, 154, 156 in the memory device 150.

According an embodiment, substantially similar operations may be performed as both foreground and background operations. For example, when the memory system 110 performs garbage collection in response to a request or a command input from the host 102 (e.g., Manual GC), garbage collection can be considered a foreground operation. When the memory system 110 performs garbage collection independently of the host 102 (e.g., Auto GC), garbage collection can be considered a background operation.

When the memory device 150 includes a plurality of dies (or a plurality of chips) including non-volatile memory cells, the controller 130 may be configured to perform parallel processing regarding plural requests or commands input from the host 102 in order to improve performance of the memory system 110. For example, the transmitted requests or commands may be divided and processed in parallel within at least some of a plurality of planes, a plurality of dies or a plurality of chips included in the memory device 150. The memory interface 142 in the controller 130 may be connected to a plurality of planes, dies or chips in the memory device 150 through at least one channel and at least one way. When the controller 130 distributes and stores data in the plurality of dies through each channel or each way in response to requests or commands associated with a plurality of pages including non-volatile memory cells, plural operations corresponding to the requests or the commands can be performed individually or in parallel. Such a processing method or scheme can be considered as an interleaving method. Because data input/output speed of the memory system 110 operating with the interleaving method may be faster than that without the interleaving method, data I/O performance of the memory system 110 can be improved.

By way of example but not limitation, the controller 130 can recognize statuses regarding a plurality of channels (or ways) associated with a plurality of memory dies in the memory device 150. The controller 130 may determine the status of each channel or each way as one of, for example, a busy status, a ready status, an active status, an idle status, a normal status, and/or an abnormal status. The determination of which channel or way an instruction (and/or a data) is delivered through by the controller can be associated with a physical block address, e.g., which die(s) the instruction (and/or the data) is delivered into.

The controller 130 can refer to descriptors delivered from the memory device 150. The descriptors can include a block or page of parameters that describe something about the memory device 150, which is data with a set format or structure. For instance, the descriptors may include device descriptors, configuration descriptors, unit descriptors, and the like. The controller 130 can refer to, or use, the descriptors to determine which channel(s) or way(s) an instruction or a data is exchanged via.

Referring to FIG. 3, memory device 150 may include the plurality of memory blocks 152, 154, 156. Each of the memory blocks 152, 154, 156 may include a plurality of non-volatile memory cells. According to an embodiment, the memory block 152, 154, 156 can be a group of non-volatile memory cells that are erased together. The memory block 152, 154, 156 may include a plurality of pages corresponding to a group of non-volatile memory cells read or programmed together. In one embodiment, each memory block 152, 154, 156 may have a three-dimensional stack structure for high integration. Further, the memory device 150 may include a plurality of dies, each die including a plurality of planes and each plane including the plurality of memory blocks 152, 154, 156. The memory device 150 can be differently configured for performance of the memory system 110.

The plurality of memory blocks 152, 154, 156 in memory device 150 can be single-level cell (SLC) memory blocks, multi-level cell (MLC) Cell) memory blocks, or the like, based on the number of bits that can be stored or represented in one memory cell. An SLC memory block includes a plurality of pages implemented by memory cells, each storing one bit of data. An SLC memory block can have high data I/O operation performance and high durability. The MLC memory block includes a plurality of pages implemented by memory cells, each storing multi-bit data (e.g., two bits or more). The MLC memory block can have larger storage capacity for the same space compared to the SLC memory block. The MLC memory block can be highly integrated in view of storage capacity.

In an embodiment, the memory device 150 may be implemented with MLC memory blocks. Examples include double level cell (DLC) memory blocks, triple-level cell (TLC) memory blocks, quadruple-level cell (QLC) memory blocks and combinations thereof. A double-level cell (DLC) memory block may include a plurality of pages implemented by memory cells, each capable of storing 2-bit data. A triple-level cell (TLC) memory block can include a plurality of pages implemented by memory cells, each capable of storing 3-bit data. A quadruple-level cell (QLC) memory block can include a plurality of pages implemented by memory cells, each capable of storing 4-bit data. In another embodiment, the memory device 150 can be implemented with a block including a plurality of pages implemented by memory cells, each capable of storing five or more bits of data.

According to an embodiment, the controller 130 may use a multi-level cell (MLC) memory block in the memory device 150 (such as an SLC memory block) that stores one-bit data in one memory cell. A data input/output speed of the multi-level cell (MLC) memory block can be slower than that of the SLC memory block. For example, when an MLC memory block is used as the SLC memory block, the margin for a read or program operation can be reduced. The controller 130 can utilize a faster data input/output speed of the multi-level cell (MLC) memory block when using the multi-level cell (MLC) memory block as the SLC memory block. For example, the controller 130 can use the MLC memory block as a buffer to temporarily store an item of data, because the buffer may require a high data input/output speed for improving performance of the memory system 110.

Further, according to an embodiment, the controller 130 may program data in a multi-level cell (MLC) a plurality of times without performing an erase operation on a specific MLC memory block in the memory device 150. Non-volatile memory cells have a feature that does not support data overwrite. However, the controller 130 may use a feature in which a multi-level cell (MLC) may store multi-bit data, in order to program plural pieces of 1-bit data in the MLC a plurality of times. For a MLC overwrite operation, the controller 130 may store the number of program times as separate operation information when a 1-bit data is programmed in a non-volatile memory cell. According to an embodiment, an operation for uniformly levelling threshold voltages of non-volatile memory cells can be carried out before another data is overwritten in the same non-volatile memory cells.

In an embodiment, the memory device 150 is embodied as a non-volatile memory such as a flash memory, for example, as a NAND flash memory, a NOR flash memory, and the like. In an embodiment, the memory device 150 may be implemented by at least one of a phase change random access memory (PCRAM), a ferroelectrics random access memory (FRAM), a spin injection magnetic memory (STT-RAM), and a spin transfer torque magnetic random access memory (STT-MRAM), or the like.

Referring to FIG. 4, a controller 130 in a memory system may operate along with the host 102 and memory device 150. As illustrated, the controller 130 includes a host interface 132, a flash translation layer (FTL) 240, as well as the memory interface 142, and the memory 144 previously identified in connection with FIG. 3.

According to an embodiment, the error correction circuitry 138 illustrated in FIG. 3 may be in the flash translation layer (FTL) 240. In another embodiment, the error correction circuitry 138 may be implemented as a separate module, a circuit, firmware, or the like included in, or associated with, the controller 130.

The host interface 132 may be capable of handling commands, data, and the like transmitted from the host 102. By way of example but not limitation, the host interface 132 may include a command queue 56, a buffer manager 52, and an event queue 54. The command queue 56 may sequentially store commands, data, and the like, received from the host 102 and output them to the buffer manager 52, for example, in an order in which they are stored. The buffer manager 52 may classify, manage, or adjust the commands, the data, and the like, which are received from the command queue 56. The event queue 54 may sequentially transmit events for processing the commands, the data, and the like, received from the buffer manager 52.

A plurality of commands or data of the same characteristic (e.g., read or write commands) may be transmitted from the host 102, or plurality of commands and data of different characteristics may be transmitted to the memory system 110 after being mixed or jumbled by the host 102. For example, a plurality of commands for reading data (read commands) may be delivered, or commands for reading data (read command) and programming/writing data (write command) may be alternately transmitted to the memory system 110. The host interface 132 may store commands, data, and the like, which are transmitted from the host 102, to the command queue 56 sequentially.

Thereafter, the host interface 132 may estimate or predict what type of internal operation the controller 130 will perform according to the characteristics of commands, data, and the like, which have been entered from the host 102. The host interface 132 can determine a processing order and a priority of commands, data and the like, based at least on their characteristics.

According to characteristics of commands, data, and the like transmitted from the host 102, the buffer manager 52 in the host interface 132 is configured to determine whether the buffer manager should store commands, data, and the like, in the memory 144 or should deliver the commands, the data, and the like to the flash translation layer (FTL) 240. The event queue 54 receives events, entered from the buffer manager 52, which are to be internally executed and processed by the memory system 110 or the controller 130 in response to the commands, the data, and the like, transmitted from the host 102. The event queue 54 may then deliver the events to the flash translation layer (FTL) 240 in an order, e.g., in the order received.

In accordance with an embodiment, the flash translation layer (FTL) 240 illustrated in FIG. 4 may implement a multi-thread scheme to perform the data input/output (I/O) operations. A multi-thread FTL may be implemented through a multi-core processor using multi-thread included in the controller 130.

In accordance with an embodiment, the flash translation layer (FTL) 240 can include a host request manager (HRM) 46, a map manager (MM) 44, a state manager 42, and a block manager 48. The host request manager (HRM) 46 can manage the events entered from the event queue 54. The map manager (MM) 44 can handle or control a map data. The state manager 42 can perform garbage collection (GC) or wear leveling (WL). The block manager 48 can execute commands or instructions onto a block in the memory device 150. According to an embodiment, the error correction circuitry 138 shown in FIG. 3 could be included in the flash translation layer (FTL) 240. According to an embodiment, the error correction circuitry 138 could be implemented through a module, a circuit or a firmware included in the controller 130.

Further, according to an embodiment, the flash translation layer (FTL) 240 can perform operations performed by the input/output controller 192 and the journaling manager 194, while the memory interface 142 can perform operations performed by the transceiver 198.

By way of example but not limitation, the host request manager (HRM) 46 can use the map manager (MM) 44 and the block manager 48 to handle or process requests according to the read and program commands, and events which are delivered from the host interface 132. The host request manager (HRM) 46 can send an inquiry request to the map manager (MM) 44, to determine a physical address corresponding to the logical address which is entered with the events. The host request manager (HRM) 46 can send a read request with the physical address to the memory interface 142, to process the read request (handle the events).

In an embodiment, the host request manager (HRM) 46 can send a program request (write request) to the block manager 48 to program data to a specific empty page (no data) in the memory device 150. Then, the host request manager (HRM) 46 can transmit a map update request corresponding to the program request to the map manager (MM) 44, in order to update an item relevant to the programmed data in information of mapping the logical-physical addresses to each other.

The block manager 48 can convert a program request delivered from the host request manager (HRM) 46, the map manager (MM) 44, and/or the state manager 42, to a flash program request used for the memory device 150 in order to manage flash blocks in the memory device 150. To maximize or enhance program or write performance of the memory system 110 (e.g., see FIG. 3), the block manager 48 may collect program requests and send flash program requests for multiple-plane and one-shot program operations to the memory interface 142. In an embodiment, the block manager 48 sends several flash program requests to the memory interface 142 to enhance or maximize parallel processing of the multi-channel and multi-directional flash controller.

In an embodiment, the block manager 48 can be configured to manage blocks in the memory device 150 according to the number of valid pages, select and erase blocks having no valid pages when a free block is needed, and select a block including the least number of valid pages when it is determined that garbage collection is to be performed. The state manager 42 can perform garbage collection to move the valid data to an empty block and erase the blocks containing the moved valid data so that the block manager 48 may have enough free blocks (empty blocks with no data). When the block manager 48 provides information regarding a block to be erased to the state manager 42, the state manager 42 may check all flash pages of the block to be erased to determine whether each page is valid.

For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 sends a program request to the block manager 48 for each valid page. A mapping table can be updated through the update of the map manager 44 when the program operation is complete.

The map manager 44 can manage a logical-physical mapping table. The map manager 44 can process various requests, for example, queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request can be sent to the block manager 48 so that a dean cache block is made and the dirty map table may be stored in the memory device 150.

When garbage collection is performed, the state manager 42 copies valid page(s) into a free block, and the host request manager (HRM) 46 can program the latest version of the data for the same logical address of the page and currently issue an update request. When the state manager 42 requests the map update in a state in which copying of valid page(s) is not completed normally, the map manager 44 might not perform the mapping table update. This is because the map request is issued with old physical information when the state manger 42 requests a map update and a valid page copy is completed later. The map manager 44 may perform a map update operation to ensure accuracy when, or only if, the latest map table still points to the old physical address.

Figures 5, 6:
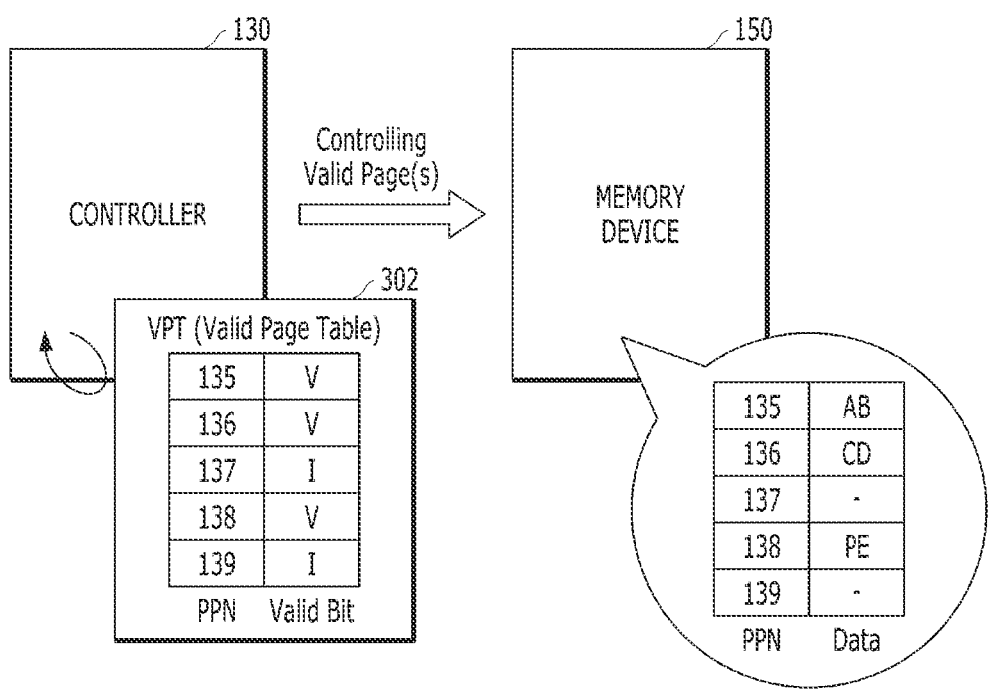
FIG. 5 illustrates an embodiment of a memory block.
FIG. 6 illustrates an example of a valid page table.

FIG. 5 illustrates an embodiment of information corresponding to a memory block in the memory device 150.

Referring to FIG. 5, metadata managed and controlled by the memory system 110 may include various types of information on each of memory blocks (PHY BLK) in the memory device 150. The metadata described in FIG. 5 is provided as an example. The types of the metadata may vary based at least on configuration of the memory device 150 and performance that the controller 130 can provide.

It is assumed that the memory device 150 includes 'nnn' memory blocks (e.g., the number of memory blocks is 'nnn'). Regarding each memory block, the metadata can include program/erase cycles (P/E Cycles), a valid page count (VPC), an invalid page count (IPC), a last modified time of memory block (Last Mod. Time), a type of data items stored in the memory block (Data Type), and the like. For example, the program/erase cycles (P/E Cycles) may be used in a wear leveling operation to control a wear level of the memory device 150. The valid page count VPC and the invalid page Count IPC can be used to determine the target memory block for garbage collection. According to an embodiment, the metadata may be provided to the virtual flash layer VFL described in FIG. 2. The metadata together with the logical-to-virtual address mapping information (L2V mapping) may be used by a recovery algorithm performed by the virtual flash layer VFL.

The metadata can be stored and adjusted in a form of identifiers such as a number, a specific symbol, or a pattern, depending on an item in the metadata. For example, the type of data (Data Type) may be written in a number or a symbol established in advance according to a type of data stored in the memory block. The last modification time (Last Mod. Time) can show an actual time when a program/delete operation is performed or a sequence number of the program/delete operation. For example, according to the metadata shown in FIG. 5, a first memory block (PHY BLK #: 0) has a program/erase cycle (P/E Cycles) of 260, a valid page count (VPC) of 3, an invalid page count (IPC) of 'aaa', and a final modification time is y1:y2:y3 (hour:minute:second) on x1-x2-x3 (year-month-day). Referring to the type of data, the first memory block is used for storing metadata.

In addition, the metadata can include information corresponding to another memory block. In another example, regarding the (nnn+1)th memory block (PHY BLK #: nnn), the metadata shows that the program/erase cycles (P/E Cycles) are 170, and the valid page count (VPC) and the invalid page count (IPC) is zero so that the (nnn+1)th memory block can be understood as a free memory block in which no data is stored.

FIG. 6 illustrates an example of a valid page table (VPT), which may include a data structure indicating whether a page in the memory device 150 stores a valid data item.

Referring to FIG. 6, of the controller 130 recognizes a state (e.g., a valid state, an invalid state, etc.) of each of a plurality of pages in the memory device 150, the controller 130 could use a page state to perform various related operations. The controller 130 can check the state (e.g., a valid status, an invalid status, etc.) of each of the plurality of pages PG in memory device 110 based on the valid page table VPT.

According to an embodiment, a valid page table 302 may include location information regarding a plurality of pages and valid page confirmation information (valid bit) for checking whether each page is valid, e.g., each page includes a valid data item (e.g., the latest data item corresponding to a specific logical address). In one embodiment, a valid page confirmation information may include information indicative of page status, and may also be referred to as page status information.

For example, if a data item 'AB' is stored in a location where a physical page number (PPN) is 135 and the data item stored in that page is valid, an area corresponding to the physical page number (PPN) of 135 in the valid page table 302 is marked as V (indicating a valid state). On the other hand, if a data item '-' is stored in a position where the physical page number (PPN) is 137 and the data item stored in that page is invalid, an area corresponding to the physical page number (PPN) of 137 in the valid page table 302 is marked as I (indicating an invalid state). For the sake of understanding, the valid page confirmation information (valid bit) is shown in the valid state V and the invalid state I, but the valid page confirmation information can be marked as a simple bitmap information such as '0' or '1'.

In one embodiment, it is assumed that, when garbage collection is performed, a valid data item from a victim block (to be erased) of garbage collection is copied or moved to a target block. A page (e.g., the location where the valid data item was stored in the victim block) becomes an invalid state. If the valid page confirmation information (valid bit) is marked as '1' for a valid state or '0' for an invalid state, the valid page check information (valid bit) for the corresponding page is changed from '1' to '0'. In this case, an invalid page count (IPC) for the victim block may increase. On the other hand, the valid page confirmation information (valid bit) for a location in the target block to which the valid data item has been copied or moved may be changed from '0' to '1'. Further, when a data item was copied or moved to the target block, a valid page count VPC for the target block may increase.

According to an embodiment, the metadata may be configured with a plurality of data structures corresponding to an operation performed by the controller 130. For example, the valid page table VPT may include information for checking whether a page is valid for only some pages PG among all pages PG in the memory device 150. According to an embodiment, the valid page table can include only valid pages so that, if other pages are not in the valid page table VPT, those pages can be recognized as an invalid page.

According to one embodiment, some pages in the valid page table VPT (for indicating whether each page is an invalid page or a valid page) may be associated with a specific memory block currently used or accessed by the controller 130. For example, the valid page table VPT may not contain information regarding pages in a free memory block or a bad memory block. But the valid page table VPT can include the valid page confirmation information (valid bit) for pages in a closed block or an open block. In these cases, a size of the valid page table VPT may be dynamically changed in the memory 144, and usage efficiency of the memory 144 may be improved.

Figure 7:
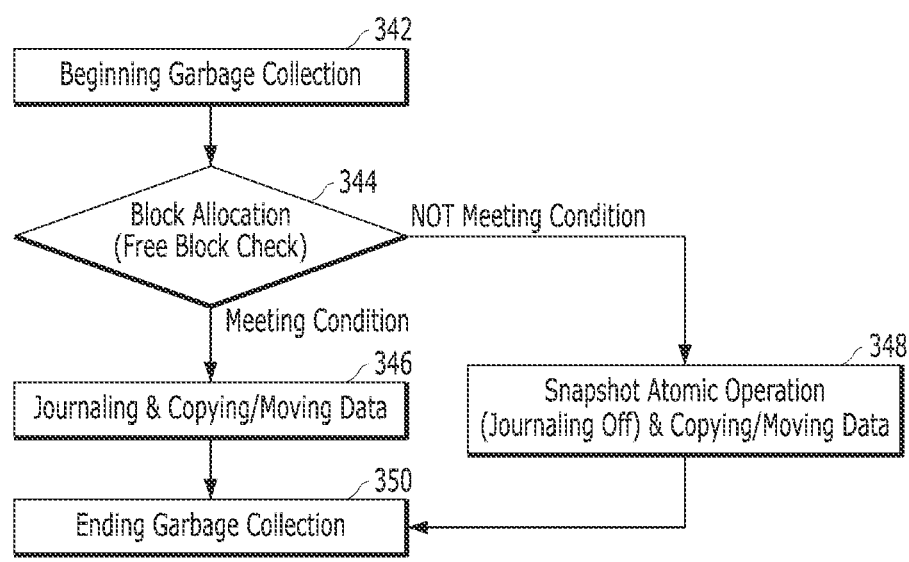
FIG. 7 illustrates an embodiment of a method of operating a memory system.

FIG. 7 illustrates an embodiment of a method for operating a memory system, which, for example, may be memory system 110.

Referring to FIG. 7, the method includes, at 342, the memory system 110 performing a garbage collection operation on the memory device 150 under a preset condition or a preset environment. For example, when the number of free blocks in the memory device 150 does not meet a preset criterion, garbage collection may be triggered. According to an embodiment, based on whether the memory device 150 receives an I/O request input from an external device (e.g., a host), the priority of the garbage collection and an operation according to the I/O request and the preset condition for triggering the garbage collection may be changed or adjusted.

At 344, when the garbage collection starts, the memory system 110 may allocate a memory block for moving or copying data. In this case, the memory system 110 may check the number of free memory blocks in the memory device 150 and determine whether a preset condition for journaling operation is satisfied. For example, to perform a journaling operation effectively, the memory system 110 may include at least one addition& free memory block. If there is at least one additional free memory block in the memory device 150, the preset condition may be satisfied. If there are no available free memory blocks for the journaling operation, the preset condition may not be satisfied.

According to an embodiment, the memory device 150 may include a plurality of dies or planes, and the preset condition may include the presence of at least one free memory block per die or plane. Meanwhile, the memory system 110 may perform the journaling operation corresponding to at least one of various types of file systems and mapping methods, so that the preset condition may be different according to the journaling operation performed by the controller 130.

At 346, when the number of free memory blocks in the memory device 150 satisfies the preset condition, the memory system 110 may move or copy a data item subjected to the garbage collection to the memory device 150 with the journaling operation.

At 348, when the number of free memory blocks does not satisfy the preset condition, the memory system 110 may move or copy a data item subjected to the garbage collection to the memory device 150 with the snapshot operation. In the snapshot operation, when a program operation is successfully completed, metadata of the file system stored in the memory 144 of the controller 130 is stored in a metadata memory block. The metadata memory block may be a predetermined location in the memory device 150. The memory system 110 may read information stored in the corresponding location at a time of initialization to perform initialization of the memory system 110, e.g., such as a booting sequence.

A 350, after the memory system 110 moves or copies a data item subjected to the garbage collection with either the journaling operation or the snapshot operation (346 or 348), the garbage collection may be terminated.

As described above, depending on whether the number of free memory blocks in the memory device 150 satisfies the preset condition, the memory system 110 may perform either the journaling operation or the snapshot operation during the garbage collection. By moving or copying a data item according to garbage collection to the memory device 150 with either the journaling operation or the snapshot operation, atomicity for the corresponding data item could be pursued.

Figure 8:
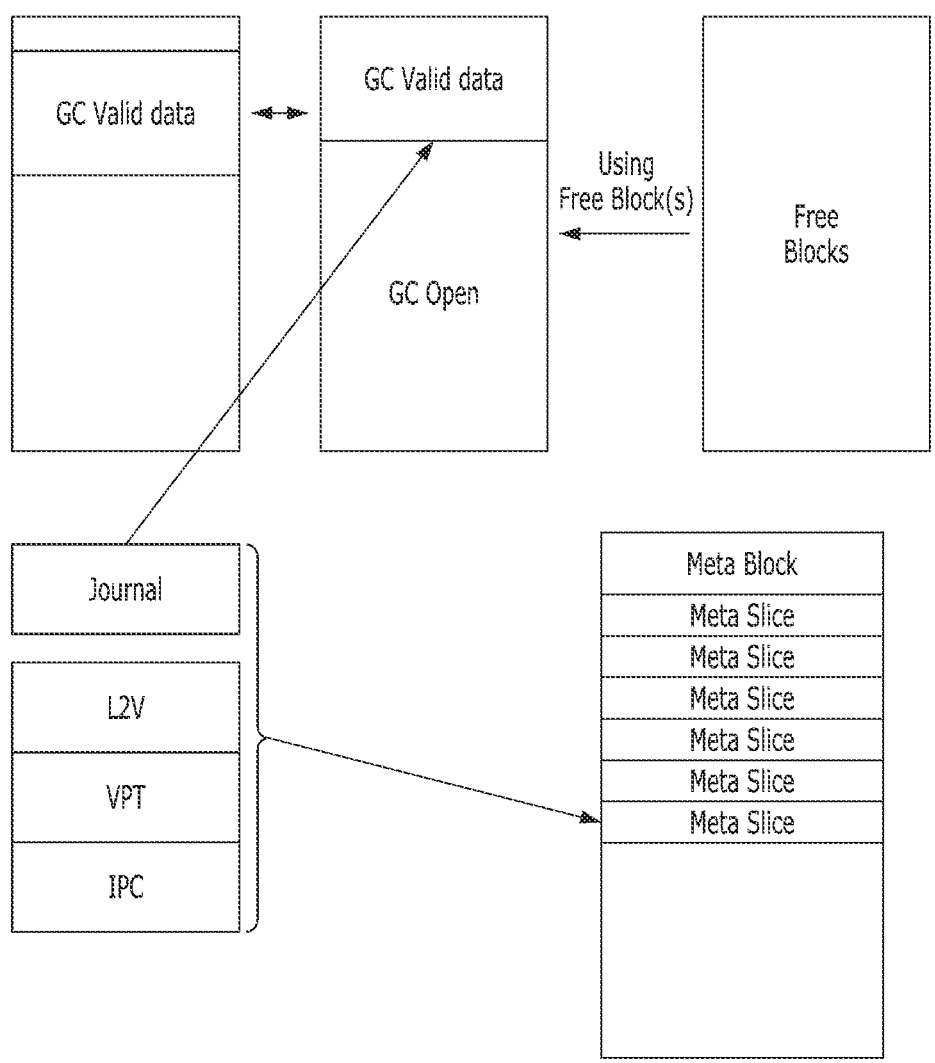
FIG. 8 illustrates an embodiment of an operation of a memory system when a number of free blocks satisfies a reference.
Figure 9:
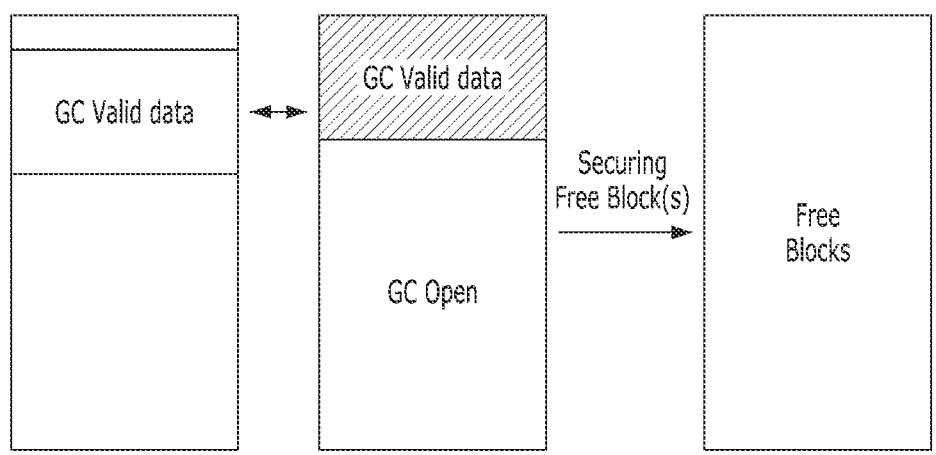
FIG. 9 illustrates an embodiment of an operation of a memory system when a number of free blocks does not satisfy a reference.
Figure 9:
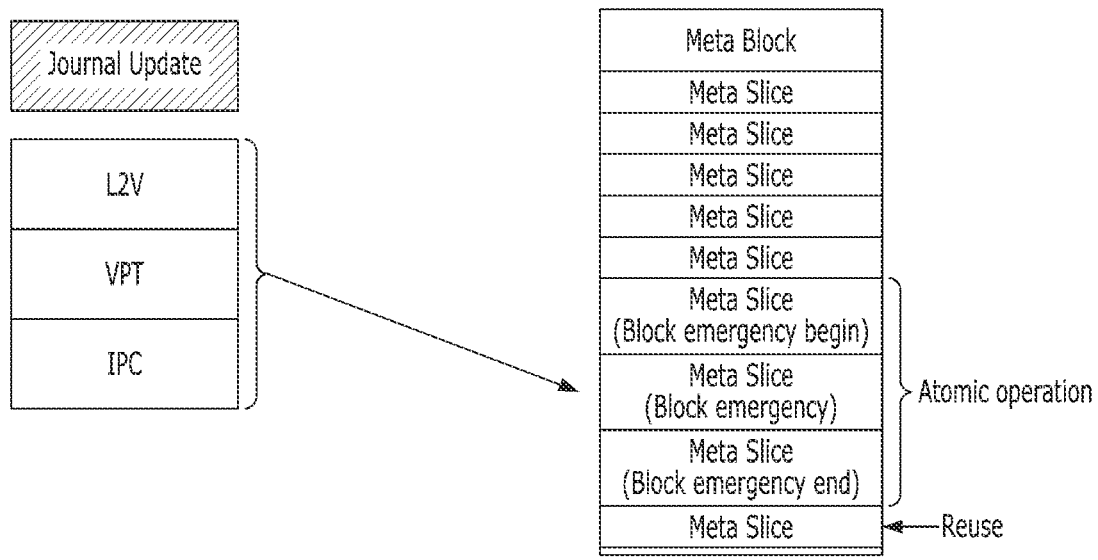

FIGS. 8 and 9 illustrate embodiments of an operation of moving or copying (programming) a valid data item in a victim block of garbage collection to a new location (target block) in the memory device 150. The operation of programming the valid data item in the victim block of garbage collection may be different according to the preset condition described with reference to FIG. 7.

Referring to FIG. 8, an operation may be performed within a memory system when the number of free blocks satisfies a reference value. For example, the memory system 110 may program a data item with the journaling operation. When the journaling operation is performed, the data item is programmed into a log block (or an open block) in the memory device 150. The memory system 110 may maintain valid data items (GC Valid data) and delete invalid data items through garbage collection. In these processes, at least one free memory block may be consumed, and the garbage collection for log blocks and data blocks may be performed (GC Open).

The memory system 110 may generate a journal including mapping information and the like after programming the data item. In addition, the memory system 110 may generate or update metadata used for the purpose of managing and controlling the memory device 150, according to the program operation for the data item. In FIG. 8, as examples of metadata, logical to virtual address mapping information (L2V Mapping), a valid page table (VPT), and an invalid page count (IPC) can be generated or updated.

The configuration of the metadata may be changed, for example, in response to the internal configuration of the memory device 150 or the design of a flash translation layer (FTL) in the controller 130 of memory system 110. The memory system 110 can be sequentially store the journal and the metadata in a metadata block, which is a preset location.

FIG. 9 illustrates an operation performed within a memory system when the number of free blocks does not satisfy a reference.

Referring to FIG. 9, when no free memory blocks in the memory device 150 exist or the number of free memory blocks is less than the preset condition, the memory system 110 may interrupt, stop or cease the journaling operation. The journal described in FIG. 8 might be not updated. However, the memory system 110 should program a valid data item in the victim block (to be erased) to another location of the memory device 150 according to garbage collection, as well as may be able to restore or read the programmed data item later. Thus, when the journaling operation is stopped, the memory system 110 may store the data item with the snapshot operation.

When no free memory blocks in the memory device 150 exist or the number of free memory blocks is less than the preset condition, a block allocation emergency mechanism may start (Block emergency begin). When the number of free blocks in the memory device 150 satisfies the preset condition, the block allocation emergency mechanism may be terminated (Block emergency end). While the block allocation emergency mechanism is performed, the memory system 110 may pursue atomicity of programmed data items through the snapshot operation (Atomic operation). When the block allocation emergency mechanism ends, the memory system 110 may sequentially store a journal and metadata in the metadata block again (Reuse), as described with reference to FIG. 8. According to an embodiment, the beginning and the end of the block allocation emergency mechanism could be marked in a metadata block.

Through the snapshot operation, the memory system 110 may store all metadata, which may be generated or updated by a program operation subjected to the garbage collection, in the metadata block which is a preset location. As described in FIG. 6, as the garbage collection is performed, a valid page table (VPT) and an invalid page count (IPC) are changed. Based on this information, the controller 130 can recognize that all valid pages stored in the victim block is copied or moved to the target block (e.g., a free memory block is secured when an erase operation is performed). While reducing the consumption of free memory blocks through performing the snapshot operation instead of the journaling operation, the memory system 110 may acquire at least one new free memory block more quickly through the garbage collection (GC Open). These processes may continue until the number of free memory blocks in the memory device 150 satisfies the preset condition based on free memory blocks newly secured through garbage collection.

In accordance with one or more embodiments, the garbage collection performed by the controller 130 (e.g., as described in FIGS. 1 to 4) may include a process of maintaining a valid data item (GC Valid data) in the memory device 150 and erasing an invalid data item in the memory device 150. According to an embodiment, the garbage collection can select a log block or a data block having a greater number of invalid pages (IPC), copy metadata related to valid data items to the metadata block, and erase the log block or the data block having no valid data items. Also, one or more actions may be performed.

According to an embodiment, the metadata stored through the snapshot operation may be used with the logical-to-virtual address mapping information (L2V mapping) through a reboot operation of the memory system 110 or a restoration or restoration operation performed at an initial stage of supplying power in the memory system 110, so that data items relevant to the metadata could be copied or moved to another location within the memory device 150.

Thus, in accordance with one or more embodiments, a memory system may be provided with increased reliability of data input/output operations. Further, a memory system may be provided which can ensure the atomicity of stored data and avoid a state of insufficient free blocks in the memory device. In addition, a memory system may be provided which can guarantee the atomicity of stored data and secure an operation margin for performing garbage collection that can obtain a free memory block in the memory device. As a result, a stuck condition of the memory system can be avoided. While embodiments have been described in accordance with a garbage collection operation, other embodiments may be performance in accordance with a predetermined operation different from a garbage collection operation, e.g., another background operation or an operation different from a background operation.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

When implemented in at least partially in software, the controllers, processors, devices, modules, managers, blocks, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

While the present teachings have been illustrated and described with respect to the specific embodiments, it will be apparent to those skilled in the art in light of the present disclosure that various changes and modifications may be made without departing from the spirit and scope of the disclosure as defined in the following claims.

What is claimed is:

1. A memory system, comprising:
a memory device including memory blocks; and
a controller configured to:
generate a result indicative of whether a number of free memory blocks satisfies a reference after beginning of garbage collection for the memory device,
selectively perform a journaling operation for a request based on the result, and
program data, collected by the garbage collection, in the memory device.

2. The memory system according to claim 1, wherein the controller is configured to:
cease the journaling operation when the number of free memory blocks is less than the reference, and
program the data in the memory device with a snapshot operation.

3. The memory system according to claim 2, wherein the controller is configured to, during the snapshot operation, store logical-to-virtual address mapping information, valid page information and invalid page information which are changed based on a program operation for the data according to the garbage collection.

4. The memory system according to claim 3, wherein the controller is configured to perform a recovery operation using the logical-to-virtual address mapping information or track a location in which the data is stored based on the logical-to-virtual address mapping information, and wherein the location is changed by the garbage collection.

5. The memory system according to claim 3, wherein the controller is configured to find out valid data in a target block subject to the garbage collection predetermined operation, when the logical-to-virtual address mapping information is incomplete because of a sudden power off.

6. The memory system according to claim 2, wherein the controller is configured to mark a beginning and an end of a block allocation emergency mechanism in the memory device through the snapshot operation, based on the result.

7. The memory system according to claim 1, wherein the journaling operation comprises at least one of:
   a first procedure for storing the data, collected by the garbage collection, in a log region of the memory device and performing a checkpoint operation when either a preset amount of time passes or the log region has no available space; or
   a second procedure for storing the data, collected by the garbage collection, in the log region and reflecting location change of the data in the file system region.

8. A method for operating a memory system, comprising:
   triggering garbage collection;
   generating a result indicative of whether a number of free memory blocks in a memory device satisfies a reference;
   selectively performing a journaling operation for a request based on the result; and
   programming data, collected by the garbage collection, in the memory device.

9. The method according to claim 8, further comprising:
   when the number of free memory blocks is less than the reference,
   ceasing the journaling operation and programming the data in the memory device with a snapshot operation.

10. The method according to claim 9, wherein the snapshot operation includes storing logical-to-virtual address mapping information, valid page information and invalid page information which are changed based on a program operation for the data according to the garbage collection.

11. The method according to claim 10, further comprising:
    performing a recovery operation using the logical-to-virtual address mapping information or track a location in which the data is stored based on the logical-to-virtual address mapping information, wherein the location is changed by the garbage collection.

12. The method according to claim 10, further comprising:
    finding out valid data in a target block subject to the garbage collection, when the logical-to-virtual address mapping information is incomplete because of a sudden power off.

13. The method according to claim 9, wherein the snapshot operation includes an operation to mark a beginning and an end of a block allocation emergency mechanism in the memory device through the snapshot operation, based on the result.

14. The method according to claim 9, wherein the journaling operation includes at least one of:
    a first procedure for storing the data, collected by the garbage collection, in a log region of the memory device and performing a checkpoint operation when either a preset amount of time passes or the log region has no available space; or
    a second procedure for storing the data, collected by the garbage collection, in the log region and reflecting location change of the data in the file system region.

15. A controller which is coupled via at least one data path to a memory device including plural memory blocks, each memory block including a plurality of non-volatile memory cells, wherein the controller comprises at least one processor, at least one memory, and logic, at least a portion of the logic comprised in hardware, the logic to:
    trigger garbage collection;
    generate a result indicative of whether a number of free memory blocks in a memory device including a plurality of memory blocks satisfies a reference;
    selectively perform a journaling operation for a request based on the result; and
    program data, collected by the garbage collection, in the memory device.

16. The controller according to claim 15, wherein the logic is configured to cease the journaling operation when the number of free memory blocks is less than the reference, and program the data in the memory device with a snapshot operation.

17. The controller according to claim 16, wherein the logic configured to, during the snapshot operation, perform an operation to store logical-to-virtual address mapping information, valid page information and invalid page information which are changed based on a program operation for the data according to the garbage collection.

18. The controller according to claim 17, wherein the logic is configured to perform a recovery operation using the logical-to-virtual address mapping information or track a location in which the data is stored based on the logical-to-virtual address mapping information.

19. The controller according to claim 17, wherein the logic is configured to find out valid data in a target block subject to the garbage collection, when the logical-to-virtual address mapping information is incomplete because of a sudden power off.

20. The controller according to claim 16, wherein the logic is configured to mark a beginning and an end of a block allocation emergency mechanism in the memory device through the snapshot operation, based on the result.

* * * * *